Dec. 30, 1947.   O. E. WOLFF   2,433,501
CLUTCH MECHANISM
Original Filed Jan. 13, 1942
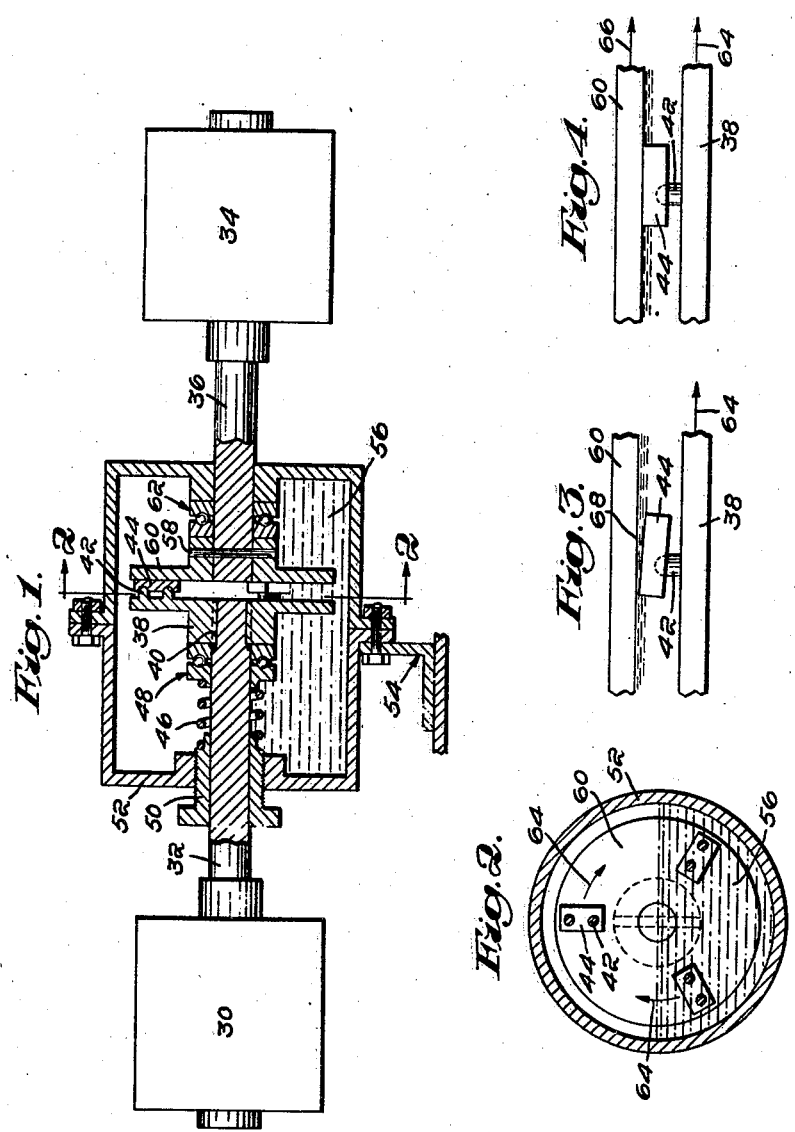
Inventor:
Otto E. Wolff
By Donald L. Brown
Attorney Patented Dec. 30, 1947

2,433,501

UNITED STATES PATENT OFFICE 2,433,501

CLUTCH MECHANISM

Otto E. Wolff, Chestnut Hill, Mass., assignor of one-fourth to Polaroid Corporation, Cambridge, Mass., a corporation of Delaware Original application January 13, 1942, Serial No. 426,615, now Patent No. 2,400,585, dated May 21, 1946. Divided and this application July 19, 1944, Serial No. 545,572

9 Claims. (Cl. 64—30)

This invention relates to clutch mechanisms, and particularly to the type of friction clutch in which engagement and disengagement are produced by changes in driving conditions.

This application is a division of my copending application Serial No. 426,615, filed January 13, 1942, now Patent No. 2,400,585 issued May 21, 1946.

It is one object of the present invention to provide a clutch which will be caused to disengage automatically by excessive load or speed or sudden changes in speed, and hence a clutch which is particularly adapted for use in tools such as screw drivers and nut runners, or as a safety clutch in a motor drive.

Another object is to provide a clutch of the above type which is particularly adapted for use in automatic gear-changing devices.

A further object is to provide a friction clutch of the above type which is adapted to produce engagement between a driving and a driven member when both members are moving at substantially the same speed, but which is adapted to disengage in the event of a change in relative speed between said members.

A still further object is to produce a clutch of the above type wherein engagement is produced by frictional locking between elements carried by the driving and driven members, and wherein disengagement is produced by reducing the coefficient of friction between said frictionally locked elements.

A still further object is to provide a clutch of the above type wherein reduction of the coefficient of friction between the engaging portions of the driving and driven members is accomplished by the introduction therebetween of anti-friction means such as a lubricant, and more particularly a relatively thin film of a lubricating fluid.

A still further object is to provide a clutch of the above type wherein the means for introducing lubricant between the frictionally engaged portions of the driving and driven members is responsive to relative motion or excessive driving load between said members.

A still further object is to provide a clutch of the above type wherein engagement between the driving and driven members is accomplished by means of friction elements such as clutch shoes carried by one of said members and adapted to engage a complementary element such as a disk carried by the other of said members, and wherein disengagement is accomplished by the introduction of a thin film of a lubricating fluid between said shoes and said complementary element.

Other objects and advantages will in part appear and in part be pointed out in the course of the following detailed description of several embodiments of the invention, which are given as non-limiting examples and are illustrated in the accompanying drawings, in which:

Figure 1 is a view, partially diagrammatic and partially in section, illustrating one embodiment of the invention;

Fig. 2 is a section on the line 2—2 in Fig. 1; and

Figs. 3 and 4 are detailed views in elevation illustrating the operation of one of the clutch shoes and complementary clutch element of the device shown in Fig. 1, Fig. 3 illustrating the relative positions of the elements when the clutch is disengaged, and Fig. 4 illustrating the relative positions when the clutch is engaged.

Referring to Fig. 1, a motor or other source of power 30 is adapted to rotate driving shaft 32, and act upon any load or work 34 adapted to be coupled to driven shaft 36. It is an object of the present invention to provide simple clutching means adapted upon engagement to lock shafts 32 and 36 together, and adapted thereafter to disengage completely in the event of relative motion between said shafts. It should be understood, however, that although shaft 32 is described as the driving shaft and shaft 36 as the driven shaft, the relation of these two elements may be reversed without departing in any way from the principles of the invention.

According to the invention, engagement between the driving and driven members is accomplished by bringing about frictional engagement between clutch elements such as clutch shoes carried by one member and a complementary clutch element carried by the other member, and disengagement is brought about by providing means for suddenly reducing the coefficient of friction between the clutch elements carried by one member and those carried by the other member. In the preferred embodiment of the invention, reduction of the coefficient of friction is accomplished by introducing a thin film of lubricant such as oil between the complementary clutch shoes.

Referring again to Fig. 1, on the end of shaft 32 there is mounted a clutch shoe carrying member 38 which may conveniently comprise a disk or similar element. Disk 38 is preferably secured to shaft 32 by means of a splined or other adjustable connection 40 which will permit sliding motion thereof along the shaft. Mounted on disk 38, as by means of pins or lugs 42, are a plurality of clutch shoes 44 which will be described in more detail hereinafter.

Sliding movement of disk 38 along shaft 32 is preferably against the tension of a spring, such for example as spring 46, and thrust bearing 48 of any conventional type. It will also be found advantageous to provide means for controlling the tension of spring 46, and an example of suitable means is shown as comprising bushing 50 threaded or otherwise adjustably mounted in the side of housing 52. Said housing may, if desired, be provided with any conventional supporting means such as that indicated at 54 in Fig. 1, and is preferably partially filled with a lubricating fluid such as an oil, as indicated at 56.

Driven shaft 36 carries fixedly secured thereon, as by any conventional means such as key 58, a complementary clutch element which, in the embodiment shown in Fig. 1, comprises a disk or plate 60. Preferably there will also be provided suitable anti-friction means between disk 60 and housing 52, such for example as thrust bearing 62 of conventional design. Clutching engagement between shafts 32 and 36 is accomplished by bringing clutch shoes 44 carried by disk 38 into solid-to-solid contact with the face of disk 60.

As is shown in Figs. 3 and 4, shoes 44 are preferably so mounted that they are free to rock about an axis substantially perpendicular to their direction of motion and parallel to the plane of the frictionally engaging surfaces. In some cases it may be desirable to facilitate the disengaging operation of the shoes by locating said axis behind the center of said shoe surface, as is shown in Figs. 3 and 4. This is not essential, however, as satisfactory results will be obtained if the axis be located at the center of the shoe, especially if the leading and trailing edges thereof are slightly rounded. The preferred operation with the type of mounting shown in Figs. 1-4 is facilitated by providing the mounting pins or lugs 42 with hemispherically shaped heads in order to secure self-alignment thereon of the shoes, as is indicated in Figs. 3 and 4. It is to be understood, however, that many other types and shapes of shoes and mountings may be used within the scope of the invention, some samples of which are shown in others of the accompanying drawings and will be described hereinafter.

In the operation of the embodiment of the invention shown in Figs. 1-4, spring 46 is first adjusted by means of bushing 50 to exert a predetermined force along shaft 32 against disk 38. This will result in pressing shoes 44 carried by said disk against the face of disk 60, thus forcing any lubricant out from between their opposing surfaces and causing said shoes to engage disk 60 in solid-to-solid, static frictional contact, as in the position shown in Figs. 1 and 4.

It will now be seen that when shafts 32 and 36 are stationary they will be locked together through the described action of the clutch elements, with the degree of friction between shoes 44 and disk 60 depending partly upon the tension of spring 46 and partly upon the materials of which they are made. If now rotation is imparted to shaft 32, as for example in the direction indicated by arrows 64, then, so long as load 34 on shaft 36 does not overcome the friction between shoes 44 and disk 60, the latter will remain in engagement and shaft 36 will rotate with shaft 32, as is indicated by arrow 66 in Fig. 4.

Assuming that shafts 32 and 36 are rotating as described above, let it now be assumed that load 34 is increased to a point such that it overcomes the friction between shoes 44 and disk 60. For example, load 34 might represent a generator the load on which becomes excessive, or the same result may be produced by rapid acceleration of shaft 32, which will increase the inertia load on the clutch. This will immediately bring about relative motion between shafts 36 and 32, and slippage will result between shoes 44 and disk 60.

As soon as slippage occurs with the type of shoe shown in Figs. 1-4, the resistance of lubricant 56 to being sheared away from the relatively moving surfaces causes the shoes to tilt about the heads of mounting lugs 42 and to ride up on a continuously reforming, thin, wedge-like film of lubricant, as is indicated at 68 in Fig. 3, simultaneously moving the disk 38 along shaft 32 against the action of spring 46. This produces an immediate large drop in the coefficient of friction between the clutch elements and thus causes sudden, complete disengagement. It should be pointed out, however, that the degree of tilt is considerably exaggerated in Fig. 3, and in practice will amount to a relatively very small angle.

The existence of lubricant film 68 between shoes 44 and disk 60 depends upon relative motion between their adjacent surfaces. So long as there is such relative motion, the clutch will not re-engage, and to a considerable extent, the greater the relative velocity the greater the bearing pressure which can be withstood by film 68. Other factors, however, contributing to the maintenance of the film include the viscosity of the lubricant, the smoothness of the complementary clutch surfaces, and the proportions of the shoe surfaces. It is in general preferable to have said proportions such that the longer dimension thereof is perpendicular to the direction of slippage, as shown in Fig. 2.

It will be seen that slippage will occur as described above whenever the load on shaft 36 exceeds the frictional contact between shoes 44 and disk 60 resulting from adjustment of spring 46. Furthermore, the result will be the same if excess load is applied on shaft 36 after the clutch is engaged and both shafts are rotating together or if the load is initially excessive. After slippage has occurred there will be relatively little turning effort exerted on shaft 36 by shaft 32, and that little will result primarily from fluid drag between shoes 44 and disk 60.

In order to re-engage the clutch, it is necessary to eliminate the film of lubricant from between the clutch elements, and this is most conveniently accomplished by bringing the relatively moving clutch elements again to substantially the same speed. In order to accomplish this result with the embodiment of the invention shown in Figs. 1-4, the excess load should first be removed from shaft 36. For example, if as mentioned above load 34 represents a generator the load on which has become excessive, the excess may be removed electrically as by opening the circuit therefrom. As another example, if load 34 represents a screw driver or nut runner driven by shaft 36, after the screw or nut is completely tightened, the resulting excess load on shaft 36 may be removed by disengaging the head of the tool from the screw or nut. If the excess load is inertia load resulting from sudden acceleration of shaft 32, it may be removed simply by decelerating said shaft.

After the excess load has been removed, the speeds of the two shafts may conveniently be synchronized by slowing down shaft 32 to the speed of shaft 36, while at the same time fluid drag between shoes 44 and disk 60 will tend to increase the speed of shaft 36. As the two speeds approach each other, the load-supporting ability of film 68 rapidly decreases until at the point of synchronization, solid-to-solid contact between the complementary clutch elements is again established, thus producing a large rise in the friction therebetween and resulting in re-engagement of the clutch. Thereafter shaft 32 may again be accelerated so long as the load on shaft 36 does not exceed the maximum which can be transmitted by the frictionally engaging elements of the clutch.

The embodiment of the invention disclosed and described in connection with the drawings represents one of many modifications embodying novel principles of operation of the invention. It is to be understood that further modifications of the invention embodying the novel principles of operation thereof will be deemed to fall within the scope of the claims. For example, in the embodiment of the invention shown in the drawings, the clutch shoes and related elements have been mounted in sliding relation to the shaft with which they are associated. It will be apparent that in certain embodiments of the invention the clutch shoes and the shoe-carrying means may be mounted fixedly for rotation with the driving or driven shaft and the cooperating clutch element. For example, the disk against which the clutch shoes bear may be mounted against spring tension to slide along the shaft with which it is associated so that when slippage occurs between the clutch shoes and the disk member against which they bear, the disk will yield to permit the entry of a thin film of lubricant between the shoes and the disk and to permit the shoes to tilt slightly in a manner previously described in connection with this embodiment of the invention.

So also, both clutch engaging assemblies, i. e., the clutch shoes and the disk against which they bear, may be mounted to slide along the shafts with which they are related against spring tension so that when slippage occurs both assemblies yield slightly.

Since certain changes may be made in the above device and different embodiments of the invention could be made without departing from its scope, it is intended that all matter contained in the above description or shown in the accompanying drawings shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. In a clutch, in combination, a rotatable driving member, a rotatable driven member, a plurality of clutch shoes carried by one of said members, means providing a continuous shoe-engaging surface carried by the other of said members, said surface being substantially perpendicular to the axis of rotation of said members, each said shoe having a friction surface conforming to the surface of said continuous shoe-engaging surface, means for holding said shoes in engagement with said shoe-engaging surface while transmitting torque, and means cooperating with said shoes for introducing a lubricant between said shoes and said surface whenever there is relative motion between said members.

2. In a clutch, in combination, a rotatable driving member, a rotatable driven member, a plurality of clutch shoes carried by one of said members, said clutch shoes being radially spaced a predetermined distance from the axis of rotation of said members and circumferentially spaced equally with respect to one another, means providing a continuous shoe-engaging surface carried by the other of said members, said surface being substantially perpendicular to the axis of rotation of said members, resilient means for holding said shoes in engagement with said surface, and lubricating means cooperating with said clutch shoes and said shoe-engaging surface for introducing a film of lubricant between said shoes and said surface whenever there is relative motion between said members.

3. In a clutch, in combination, a rotatable driving member, a rotatable driven member, a plurality of clutch shoes carried by one of said members, means providing a continuous shoe-engaging surface carried by the other of said members, said surface being substantially perpendicular to the axis of rotation of said members, resilient means for holding said shoes in engagement with said surface, means for mounting said shoes for limited pivotal movement about axes perpendicular to the direction of motion of said shoes, and lubricating means cooperating with said clutch shoes and said shoe-engaging surface for introducing a film of lubricant between said shoes and said surface whenever there is relative motion between said members.

4. In a clutch, in combination, a rotatable driving member, a rotatable driven member, a plurality of clutch shoes carried by one of said members, means providing a continuous shoe-engaging surface carried by the other of said members, said surface being substantially perpendicular to the axis of rotation of said members, means for holding said shoes in engagement with said surface, and lubricating means cooperating with said clutch shoes and said shoe-engaging surface for introducing and maintaining a continuous film of lubricant between said shoes and said surface whenever there is relative motion between said members to substantially completely disengage sadi members from one another on overload, said last-named means maintaining said shoes and shoe-engaging surface substantially completely disengaged subsequent to overload irrespective of release of overload until such time as there is no relative rotation between said driving and driven members.

5. In a clutch, in combination, a rotatable driving member, a rotatable driven member, a plurality of clutch shoes carried by one of said members, means providing a continuous shoe-engaging surface carried by the other of said members, said surface being substantially perpendicular to the axis of rotation of said members, means for mounting said shoes to tilt about axes perpendicular to the direction of rotation of said members, each said tilting axis being closer to the trailing edge of each said shoe than to the forward edge thereof, means for holding said shoes in engagement with said surface, and means cooperating with said shoes for introducing a lubricant between said shoes and said surface whenever there is relative motion between said members.

6. In a clutch, in combination, a rotatable driving member, a rotatable driven member, a plurality of clutch shoes carried by one of said members, means providing a continuous shoe-engaging surface carried by the other of said members, said surface being substantially perpendicular to the axis of rotation of said members, means for mounting said shoes to tilt about axes perpendicular to the direction of rotation of said members, each said tilting axis being closer to the trailing edge of each said shoe than to the forward edge thereof, spring means for holding said shoes in engagement with said surface, and means cooperating with said shoes for introducing a lubricant between said shoes and said surface whenever there is relative motion between said members.

7. In a clutch, in combination, a rotatable driving member, a rotatable driven member, a plurality of clutch shoes carried by one of said members, each of said shoes being wider than it is long, means providing a continuous shoe-engaging surface carried by the other of said members, said surface being substantially perpendicular to the axis of rotation of said members, means for mounting said shoes to tilt about axes perpendicular to the direction of rotation of said members, each said tilting axis being closer to the trailing edge of each said shoe than to the forward edge thereof, means for holding said shoes in engagement with said surface, and means cooperating with said shoes for introducing a lubricant between said shoes and said surface whenever there is relative motion between said members.

8. A friction clutch of the character described comprising, in combination, a rotatable driving shaft, a plurality of clutch shoes carried by said shaft and axially movable with respect thereto, each of said shoes being wider than it is long, a rotatable driven shaft, a shoe-engaging disk carried by said shaft, spring means for forcing said shoes into engagement with said disk, and means for introducing a lubricant between said shoes and said disk when the speed of rotation of one of said shafts exceeds the speed of rotation of the other of said shafts.

9. A friction clutch of the character described comprising, in combination, a rotatable driving shaft, a plurality of clutch shoes carried by said shaft and axially movable with respect thereto, each of said shoes being wider than it is long and being pivoted to tilt about an axis substantially perpendicular to the direction of rotation of said driving shaft, said axis being closer to the trailing edge of said shoe than to the forward edge thereof, a rotatable driven shaft, a shoe-engaging disk carried by said shaft, spring means for forcing said shoes into engagement with said disk, and means for introducing a lubricant between said shoes and said disk when the speed of rotation of one of said shafts exceeds the speed of rotation of the other of said shafts.

OTTO E. WOLFF.

REFERENCES CITED

The following references are of record in the file of this patent:

FOREIGN PATENTS

| Number | Country | Date |
|---|---|---|
| 534,161 | Germany | 1931 |
| 429,837 | Germany | 1926 |
| 23,655 | Austria | 1906 |
| 19,710 | Australia | 1934 |